United States Patent Office 3,639,543
Patented Feb. 1, 1972

3,639,543
PROCESS FOR MAKING PHOSPHORUS-CONTAINING POLYETHER POLYOLS AND PRODUCT OF THE PROCESS
Robert A. Newton and Donnell A. Ballard, Lake Jackson, Tex., assignors to The Dow Chemical Company, Midland, Mich.
No Drawing. Filed Feb. 19, 1968, Ser. No. 706,623
Int. Cl. C07f 9/08; C08g 22/44
U.S. Cl. 260—953          9 Claims

ABSTRACT OF THE DISCLOSURE

Phosphorus-containing polyether polyols are made by a process comprising reacting an alkylene oxide with a mixture of a polyether polyol and a phosphoric acid. The phosphorus-containing polyether polyols produced by this process are useful in making fire resistant polyurethane foams.

BACKGROUND OF THE INVENTION

Polyurethanes, particularly in the form of foams, have many uses in which fire resistance is an important and highly desirable property. It is well known to impart some degree of fire resistance to polyurethane foams by incorporating into such foams a fire resisting agent such as phosphorus. The fire resisting agent is usually introduced into the foam by way of the starting materials, e.g. phosphorus-containing polyurethane foams are made from phosphorous-containing polyether polyols.

One method of producing a phosphorus-containing polyether polyol is by blending the reaction product of phosphoric acid and an alkylene oxide with a polyether polyol. There are, however, several problems attendant to this process which tend to increase production costs and lower the quality of the resulting phosphorus-containing polyether polyol. A particularly troublesome problem is that of blending the product of the phosphoric acid and alkylene oxide reaction with the polyether polyol. A truly homogeneous blend, which is highly desirable, is very difficult to obtain. Heating the mixture while blending is one answer to this problem, but heating tends to lead to an increase in the acidity of the resulting phosphorus-containing polyether polyol. High acidity gives rise to many processing difficulties in foam manufacture and thus it is highly desirable to produce a phosphorus-containing polyether polyol which has a very low acidity. The problem of high acidity arises in another step of the above process. By this method, it is quite difficult to esterify all three of the hydroxyl groups of the phosphoric acid so as to completely neutralize it. It is known that the use of an inert solvent in the phosphoric acid and alkylene oxide reaction step will reduce the acidity of the resulting product. (See U.S. Pat. 3,094,549.)

SUMMARY OF THE INVENTION

It has now been found that phosphorus-containing polyether polyols are made by a process comprising reacting an alkylene oxide with a mixture of a polyether polyol and a phosphoric acid. The formation of the resulting phosphorus-containing polyether polyol in this manner substantially eliminates blending difficulties and lowers the acidity of the resulting product so that it approaches zero.

In order to practice this invention, a phosphoric acid is first mixed with a polyether polyol. An alkylene oxide is then added, with stirring, to the resulting mixture in an amount sufficient to reduce the acidity of the resulting phosphorus-containing polyether polyol to the desired level. The reaction between the alkylene oxide and the phosphoric acid used is conveniently started at a relatively low temperature, e.g. between 0 and 70° C., and thereafter raised as the reaction proceeds until a maximum of between 60 and 160° C. is reached. Depending upon which temperatures are used the mixture is allowed to digest for a time sufficient to reduce the acidity of the product to the desired level, typically an acid number of less than 0.1 and preferably around zero.

It is to be understood that not only can phosphoric acid itself be used in the practice of this invention, but also a phosphoric acid which is partially esterified can suitably be employed. Examples of partially esterified phosphoric acids which can be used in this invention are the monoesters, diesters and mixtures thereof of phosphoric acid such as those obtained by a phosphoric acid and alkylene oxide reaction or a $P_2O_5$ and methanol, butanol or decanol reaction. Preferably, phosphoric acid itself is employed at concentrations of between 90 and 115 percent, calculated as $H_3PO_4$, and most preferably between 100 and 115 percent. In general, the weight of phosphoric acid added is less than 10% of the resulting phosphorus-containing polyol. The weight of a partially esterified phosphoric acid added is generally less than 50%.

The alkylene oxides used in this invention include not only the normal alkylene oxides, e.g. ethylene oxide, propylene oxide and the isomeric normal butylene oxides, but also oxides containing inert substituents such as bromine, chlorine, iodine, alkyl, aryl, alkoxy and aryloxy and, in addition, oxides containing hydroxyl groups can suitably be used. Specific examples of these substituted oxides are epichlorohydrin, epibromohydrin, epiiodohydrin, 3-methyl-1,2-octylene oxide, cyclohexene oxide, styrene oxide, 3-methoxy-4,5-dodecylene oxide, 3-phenyoxy-1,2-octylene oxide and glycidol.

The polyether polyol useful in this invention is any polyether polyol which can be made into a polyurethane foam. For example, polyurethane foams are produced from such polyether polyols as polyoxypropylene glycols, polyoxybutylene glycols and other polyoxyalkylene glycols such as those formed from the polymerization of ethylene oxide, propylene oxide, the butylene oxides and the copolymerization of mixed oxides, e.g. ethylene oxide and propylene oxide. Such polymerization includes reaction of the alkylene oxide with an initiator having a multiplicity of active hydrogen atoms. Commonly used initiators include alkylene glycols, glycerol, sorbitol, sucrose, pentaerythritol, ammonia, primary amines, and the like. This process is equally applicable to both the rigid and flexible foam-making polyether polyols and the molecular weight of said polyols can vary widely, e.g. between 500 and 15,000. The preferred molecular weight of said polyether polyols is between about 600 and 10,000 and most preferably between about 700 and 7,000.

The mole ratio of alkylene oxide to phosphoric acid should be large enough to reduce the acidity of the product to the desired level. Preferably, the molar ratio of an alkylene oxide to ortho-phosphoric acid is at least three to one. Similarly, the molar ratio of an alkylene oxide to a monoester of ortho-phosphoric acid is preferably at least two to one and the molar ratio of an alkylene oxide to a diester of ortho-phosphoric acid is preferably at least one to one. The preferred molar ratio of alkylene oxide to phosphoric acid will vary depending upon the types of alkylene oxide and phosphoric acid used. The upper limit of the molar ratio of alkylene oxide to ortho-phosphoric acid is not critical and can suitably be 50:1 or more.

DESCRIPTION OF SPECIFIC EMBODIMENTS

The following are specific examples of the practice of this invention.

Example 1

In a ten gallon reactor under a nitrogen atmosphere was placed 51.5 pounds of a polyol having a hydroxyl number of about 600, made from the following ratios of reactants: 2.5 moles glycerine, 1 mole sucrose and 0.5 mole $H_2O$ with 1 mole of propylene oxide per hydroxyl group in said mixture. 5.5 pounds 105% $H_3PO_4$ was mixed with this polyether polyol. To this mixture was added, with stirring at ambient temperature, 35 pounds of propylene oxide. The mixture was heated slowly to around 80° C. and allowed to digest for 6.5 hours. The pH of the resulting phosphorus-containing polyether polyol was 8.7 and the acid number was 0.28. 5 pounds of propylene oxide was added to the resulting phosphorus-containing polyether polyol and the resulting mixture was allowed to digest 14 hours longer at a temperature of 80° C. The acid number was then less than 0.02. Percent P, 2.24; hydroxyl number, 527.

Example 2

14,388 pounds of a glycerine-propylene oxide reaction product having a molecular weight of around 3000 was charged to a 2000 gallon stainless steel reactor under a nitrogen atmosphere. 607 pounds of a hydroxyalkyl phosphate ester (prepared according to U.S. Pat. 3,094,549) was then added, with stirring. After adding 8 pounds of propylene oxide, with stirring at ambient temperature, the mixture was allowed to digest for 10 hours at a temperature of 120° C. The pH was 3.5 and the acid number was 1.34. To the resulting phosphorus-containing polyether polyol was added, with stirring at ambient temperature, 150 pounds of propylene oxide. After two hours digestion at 120° C., the pH was 7.9 and the acid number was less than 0.001.

Example 3

Using the same procedure and polyol as in Example 2, 1682 pounds of said polyol was mixed with 23 pounds of 105% $H_3PO_4$. 95 pounds of propylene oxide was added, with stirring at ambient temperature. The temperature was increased to 60° C. and the mixture was allowed to digest for 23.5 hours. The pH was 8.1.

Urethane foam prepared from this material by reaction with isocyanate had excellent fire retardant properties.

Example 4

Using similar procedures and 450 pounds of an ethylene oxide-propylene oxide reaction product having a molecular weight of around 4100, 6 pounds of 105% $H_3PO_4$ and 35 pounds of propylene oxide with digestion for 19 hours at 60° C., the pH was 8.6 and the acid number was less than 0.05.

Example 5

Using the procedure and 16,000 pounds of the polyol of Example 2, 186.5 pounds of 113.7% $H_3PO_4$ and 1380 pounds of propylene oxide, the mixture was digested at 60° C. for seven hours and thereafter at 120° C. for seven hours. The pH was 5.1 and the acid number was 0.028. An additional 2 hours of digestion at 120° C. resulted in a pH of 7.2 and a percent P of 0.38.

We claim:
1. The method for making a phosphorus-containing polyether polyol of low acidity which comprises reacting by contacting an alkylene oxide with a mixture of:
   (I) a phosphoric acid which is
      (a) phosphoric acid of about 90–115% equivalent $H_3PO_4$ concentration or
      (b) a partial ester of phosphoric acid formed by the reaction of the acid with
         (1) an alkylene oxide or
         (2) an alkanol of up to 10 carbon atoms, and
   (II) a polyether polyol of molecular weight about 500 to 15,000 made by the reaction of an alkylene oxide with glycerine, sucrose, ethylene glycol, propylene glycol, butylene glycol, sorbitol, pentaerythritol or ammonia,
at least one mole of alkylene oxide being used for each equivalent of active hydrogen of the phosphoric acid, the alkylene oxides being of the group consisting of ethylene oxide, propylene oxide, butylene oxide, epichlorohydrin, epibromohydrin, epiiodohydrin, 3-methyl-1,2-octylene oxide, cyclohexene oxide, styrene oxide, 3-methyl-4,5-dodecylene oxide, 3-phenoxy-1,2-octylene oxide and glycidol.

2. The product made by the process as defined in claim 1.

3. A method as defined in claim 1 wherein the temperature is initially between 0 and 70° C. and thereafter is raised until the final temperature is between 60° and 160° C.

4. A method as defined in claim 1 wherein the phosphoric acid is ortho-phosphoric acid.

5. A method as defined in claim 1 wherein the phosphoric acid is a partially esterified phosphoric acid.

6. A process as defined in claim 1 wherein the acid number of the resulting product is less than 0.1.

7. The method of claim 1 wherein the initiator is glycerine, sucrose, ethylene glycol, propylene glycol, butylene glycol, sorbitol, pentaerythritol, or a mixture of at least two of the foregoing initiators.

8. A method as defined in claim 7 wherein the alkylene oxide is ethylene oxide, propylene oxide or a normal butylene oxide.

9. The process of claim 1 wherein the proportions of (I) to (II) are such that the phosphorus content of the final product is not more than about 10% by weight, calculated as $H_3PO_4$.

References Cited

UNITED STATES PATENTS 3,309,427   3/1967   Zech et al. _____ 260—953 X

CHARLES B. PARKER, Primary Examiner

A. H. SUTTO, Assistant Examiner

U.S. Cl. X.R.

260—2.5 AJ, 2.5 AR, 77.5 AR, 920, 929, 945, 980